No. 737,883. PATENTED SEPT. 1, 1903.
P. SYNNESTVEDT.
VEHICLE DRIVING MECHANISM.
APPLICATION FILED FEB. 24, 1902.
NO MODEL.
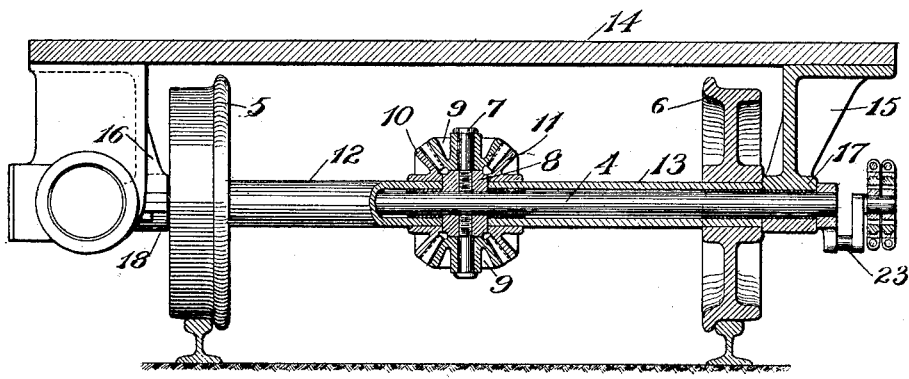
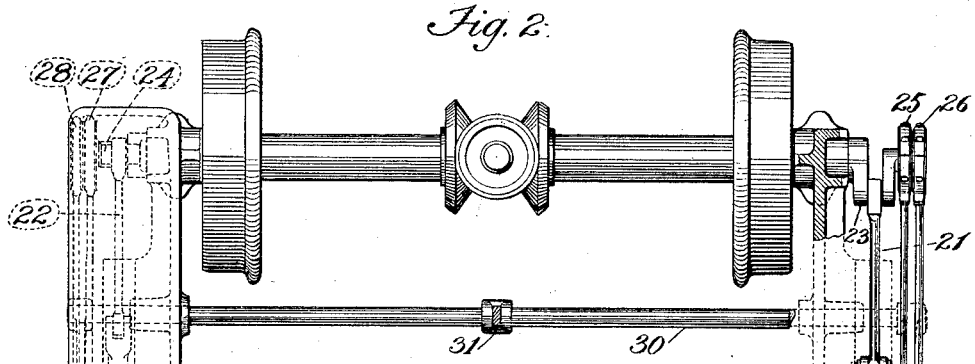
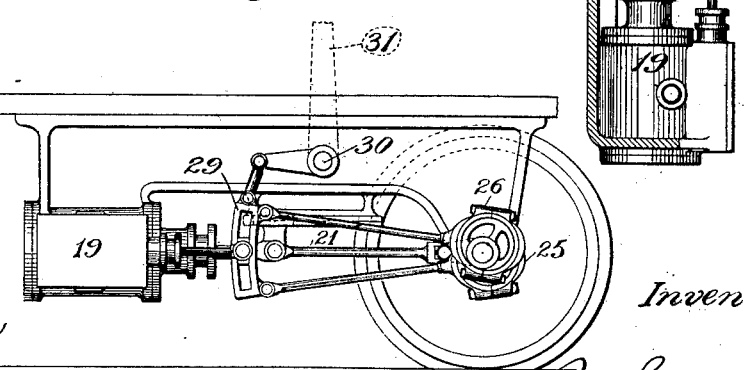
Witnesses:
Paul Carpenter
Oscar A. Thelin
Inventor
Paul Synnestvedt No. 737,883. Patented September 1, 1903.

UNITED STATES PATENT OFFICE.

PAUL SYNNESTVEDT, OF GLENVIEW, ILLINOIS.

VEHICLE DRIVING MECHANISM.

SPECIFICATION forming part of Letters Patent No. 737,883, dated September 1, 1903.

Application filed February 24, 1902. Serial No. 95,496. (No model.)

*To all whom it may concern:*

Be it known that I, PAUL SYNNESTVEDT, a citizen of the United States, residing at Glenview, county of Cook, and State of Illinois, have invented certain new and useful Improvements in Vehicle Driving Mechanism, (Case No. 8,) of which the following is a specification.

This invention has reference to the provision of a novel arrangement of driving mechanism for vehicles where it is desired to drive two wheels mounted upon an axle from a common driving-shaft and at the same time permit of differential rotative movement of such wheels, such as would be required in turning sharp corners.

The primary object of my invention is the provision of mechanism of the type specified in which the driven wheels and the driving-shaft are mounted about the same axis of rotation and yet in which the wheels have such differential movement relative to each other as has already been referred to.

The above as well as such other objects as may hereinafter appear I obtain by means of the construction which I have illustrated in preferred form in the accompanying drawings, in which—

Figure 1 is a perspective section with some of the parts in elevation, showing a truck or vehicle mounted upon flanged wheels. Fig. 2 is a plan view of the mechanism indicated in Fig. 1, and Fig. 3 is a side elevation.

It is to be observed that while I have shown my improvements as applied to a vehicle having flanged wheels I do not in any wise intend to limit myself thereto, but to include as within the scope of my claims all types of vehicles, it being obvious that the same improvements are applicable to what are known as "automobiles" or "motor-vehicles," which run on common roads or highways.

In carrying out my invention I provide first a driving-shaft 4, a couple of driving-wheels 5 and 6, mounted upon said shaft, but rotatable relative thereto and arranged to be driven from the driving-shaft 4 through the differential-gear device 7, which is located, preferably, as shown in Fig. 1 of the drawings, and which has a central member 8, carrying equalizing-gears 9, which central member 8 is keyed or otherwise secured firmly to the driving-shaft 4 and which through the equalizing-gears 9 drives the two side gears 10 and 11, from which, respectively, power is transmitted to the wheels 5 and 6 through the sleeves 12 and 13.

The vehicle-body 14 is preferably supported by brackets 15 and 16, which have journal-bearings 17 and 18 upon the driving-shaft 4 adjacent to the driving-wheels 6 and 5.

Arranged preferably outside of the journal-bearings 17 and 18 is the driving mechanism for the driving-shaft 4, which in this case I have shown as a couple of engines 19 and 20, the pitmen 21 and 22 whereof are connected to cranks 23 and 24, which latter are keyed to the driving-shaft 4 in a position at right angles to each other—that is, ninety degrees—so as to avoid danger of the engines getting on "dead-center."

The valve mechanism of the engine is composed, preferably, of the usual form of link-motion, having the eccentrics thereof 25 and 26 and 27 and 28 mounted upon an extension of the crank, as shown in the several figures of the drawings, preferably outside of the crank. The links 29 are arranged to be raised and lowered by a rock-shaft 30, extending across the vehicle, as shown, through the instrumentality of the handle 31.

From the above description it will be obvious that the operation of my invention is as follows: The engines driving the driving-shaft 4 transmit relative movement from the central member 8 to the differential gear and thence through the equalizing-gears 9 to the sleeves 12 and 13 and wheels 5 and 6, the whole rotating in unison when traveling in a straight line, but at a differential speed when turning a corner, in the manner peculiar to this type of apparatus.

Having thus described my invention, what I claim as new, and desire to secure by Letters Patent, is—

1. A driving mechanism for vehicles comprising in combination a driving-shaft, a pair of driving-wheels mounted on sleeves supported thereupon, means for driving said shaft, and differential gearing on the shaft and the sleeves whereby the power of the shaft is transmitted to the wheels.

2. A driving mechanism for vehicles comprising in combination a driving-shaft, means for rotating the shaft comprising engines having cranks connected with the shaft at an angle of ninety degrees, driving-wheels on sleeves mounted rotatable around said shaft, and differential gearing connecting the shaft and sleeves, substantially as described.

3. In vehicle driving mechanism the combination of a driving-shaft, motors connected thereto to rotate the same, vehicle driving-wheels rotatably mounted on said shaft, and a differential-gear connection between the shaft and the wheels, substantially as described.

4. The combination of two driving-wheels fixed on sleeves, a shaft inside said sleeves, gears on the sleeves and coöperating differential gears on the shaft engaging the same, and a motor driving the shaft and attached thereto outside the driving-wheels.

In testimony whereof I have hereunto set my hand in the presence of two subscribing witnesses.

PAUL SYNNESTVEDT.

In presence of—
PAUL CARPENTER,
H. W. SMALLEY.